(12) United States Patent
Gurunathan et al.

(10) Patent No.: US 6,548,802 B2
(45) Date of Patent: Apr. 15, 2003

(54) OPTICAL RECEIVER ZERO CALIBRATION SYSTEM AND METHOD

(75) Inventors: Mohan Gurunathan, Santa Rosa, CA (US); Zoltan D. Azary, Occidental, CA (US); Greg C. Richtenburg, Sebastopol, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 14 days.

(21) Appl. No.: 09/838,912

(22) Filed: Apr. 20, 2001

(65) Prior Publication Data

US 2002/0153475 A1 Oct. 24, 2002

(51) Int. Cl.[7] ................................................. H01J 40/14
(52) U.S. Cl. ................................. 250/214 A; 250/214.1
(58) Field of Search .................... 250/252.1, 214 R, 250/214 A, 214 LA, 559.1, 214.1; 375/219, 224, 231; 330/59, 308, 309

(56) References Cited

U.S. PATENT DOCUMENTS

| | | | | |
|---|---|---|---|---|
| 4,806,875 A | * | 2/1989 | Schaffer | 327/407 |
| 4,933,543 A | * | 6/1990 | Hull | 250/214 C |
| 5,724,095 A | * | 3/1998 | Shyu et al. | 330/9 |
| 5,796,300 A | * | 8/1998 | Morgan | 330/51 |

* cited by examiner

Primary Examiner—Stephone B. Allen
Assistant Examiner—Stephen Yam
(74) Attorney, Agent, or Firm—John L. Imperato

(57) ABSTRACT

A zero calibration system and method for an optical receiver include an illuminated photodetector, switchably coupled to an amplifier. The photodetector is de-coupled from the amplifier while illumination of the photodetector is maintained and an error signal is measured at the output of the amplifier. The photodetector is then coupled to the amplifier and subsequent signals measured at the output of the amplifier are corrected according to the measured error signal, based on a comparison of the relative values of a feedback resistor, coupled between the output and an input of the amplifier, and an equivalent resistance of the photodetector. When the ratio of the feedback resistor to the equivalent resistance does not exceed a predetermined threshold, the subsequently measured signals at the output of the amplifier are corrected by offsetting the subsequently measured signals by the measured error signal. When the ratio exceeds the predetermined threshold, the subsequently measured signals at the output of the amplifier are corrected by offsetting the subsequently measured signals by the measured error signal as modified by a correction factor.

14 Claims, 4 Drawing Sheets

OPTICAL RECEIVER ZERO CALIBRATION SYSTEM AND METHOD

BACKGROUND AND SUMMARY OF THE INVENTION

Optical receivers, that include photodiodes, amplifiers and other components, convert optical signals into corresponding electrical signals in many types of optical systems. Because this conversion, or photodetection, often involves processing low magnitude signals, periodic zero calibration of the optical receivers is performed to accommodate for offset voltages of the amplifiers that influence the accuracy of the conversion. Known zero calibration methods rely on a dark signal measurement at the output of the amplifier. During the dark signal measurement, an optical signal, normally applied to the photodiode during photodetection, is interrupted by extinguishing the optical source supplying the optical signal or by redirecting optical fibers supplying the optical signal, so that optical signals do not illuminate the photodiode. Extinguishing the optical source has the disadvantage of imposing time delays in the zero calibration of the optical receiver because of the time required for the optical source to stabilize once the optical signal is re-applied to illuminate the photodiode. Redirecting optical fibers supplying the optical signal to the photodiode has the disadvantage of introducing variations in the coupling characteristics of the interface between the photodiode and the optical fiber that decrease the accuracy of the conversion. There is a need for a zero calibration technique for an optical receiver that does not rely on interrupting the optical signal applied to the photodiode. This need is met by the zero calibration system and method constructed according to the embodiments of the present invention.

DETAILED DESCRIPTION OF THE EMBODIMENTS

Figure 1:
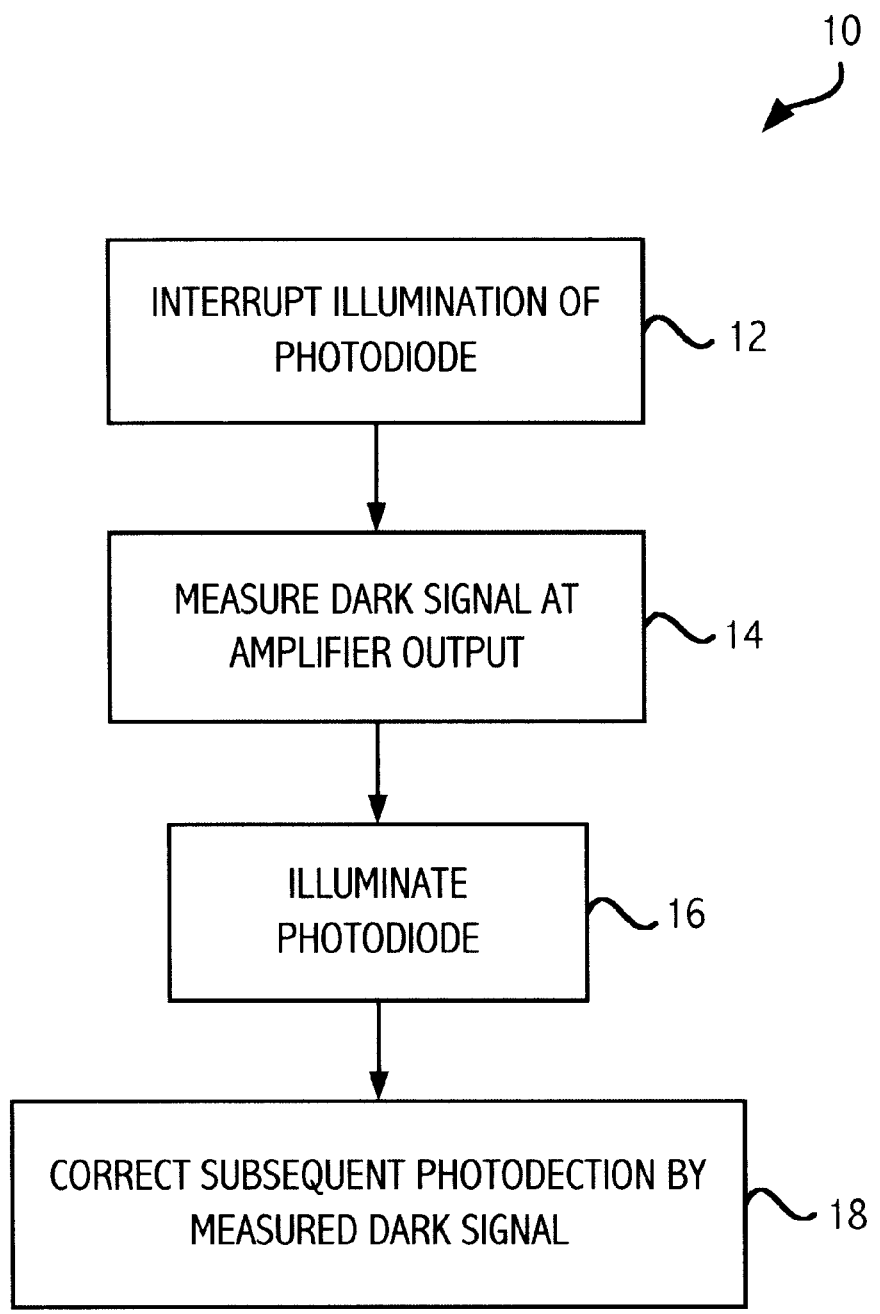
FIG. 1 shows a prior art zero calibration method.

FIG. 1 shows a prior art zero calibration method 10 for an optical receiver (not shown) that converts an applied optical signal into a corresponding electrical signal. During this conversion, or photodetection, a photodiode within the optical receiver is illuminated by an optical source while the photodiode is coupled to an amplifier input. Electrical signals are measured at the amplifier output in response to the applied optical signal. Because low magnitude signals are often present at the amplifier input during photodetection, periodic zero calibration of the optical receiver is performed to accommodate for offset voltages of the amplifier that, in the absence of accommodation, would influence the accuracy of the photodetection.

In step 12 of the prior art zero calibration method, the optical signal applied to the photodiode during photodetection is interrupted, so that the photodiode is not illuminated by the optical signal. While the photodiode is not illuminated by the optical signal, a dark signal is measured at the amplifier output as shown in step 14 of the prior art zero calibration method 10. In step 16, the photodiode is again illuminated by the optical source, and photodetection is resumed. In step 18, this photodetection subsequent to the re-illumination of the photodiode is corrected according to the measured dark signal.

While the prior art zero calibration method 10 adequately accommodates for the offset voltages of the amplifier, the prior art method 10 has several disadvantages because the dark signal measurement relied upon in the method 10 involves interrupting the applied optical signal. In the prior art zero calibration method, the applied optical signal is interrupted by extinguishing the optical source supplying the optical signal, or by redirecting optical fibers supplying the optical signal so that optical signals do not illuminate the photodiode. Extinguishing the optical source has the disadvantage of imposing time delays in the zero calibration because of the time required for the optical source to stabilize once the optical signal is re-applied to the photodiode. Redirecting optical fibers supplying the optical signal to the photodiode has the disadvantage of introducing variations in the coupling characteristics of the interface between the photodiode and the optical fiber that decrease the accuracy of the conversion.

Figure 2A:
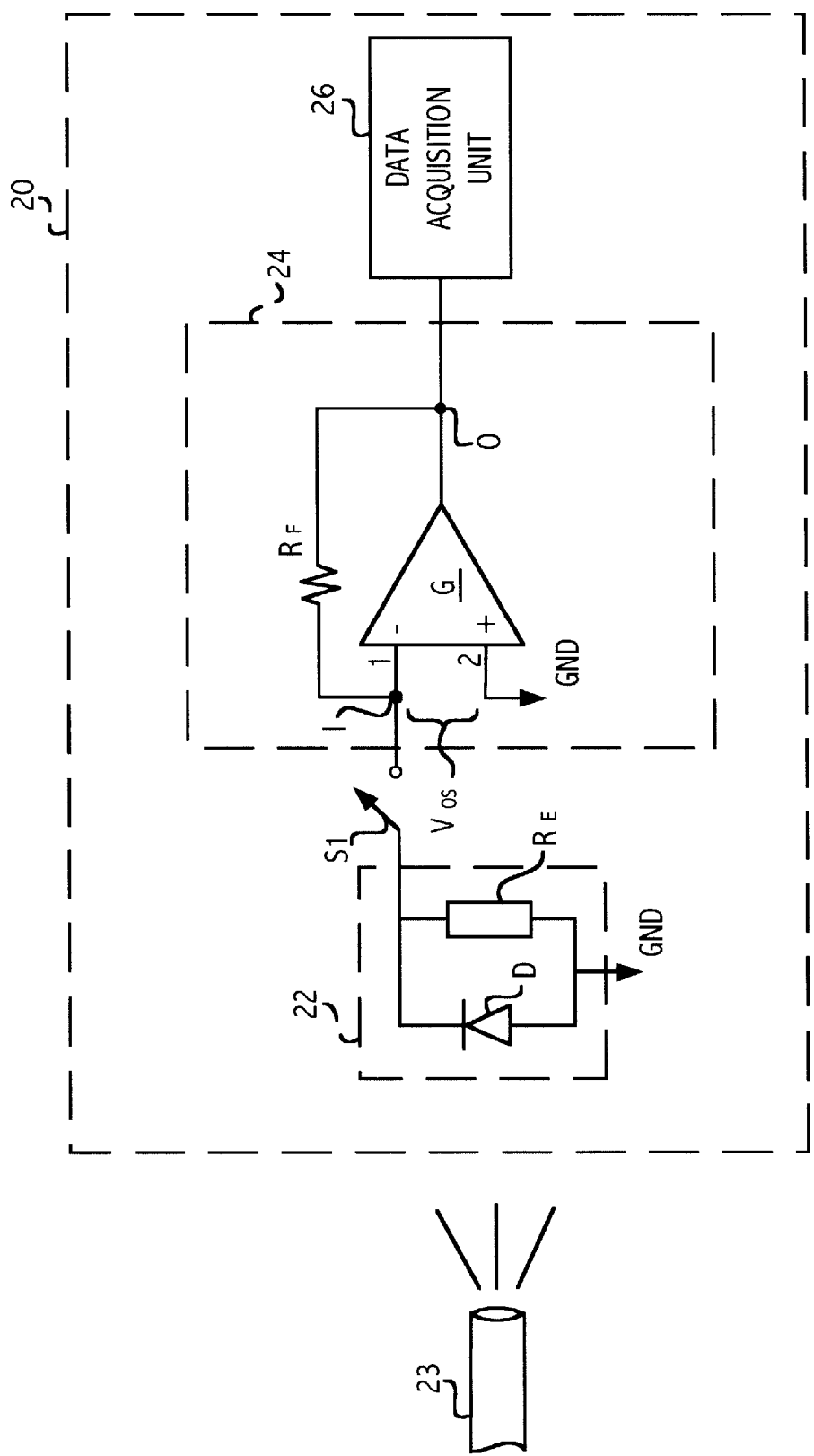
FIGS. 2A–2B show a zero calibration system for an optical receiver constructed according to the embodiments of the present invention.
Figure 2B:
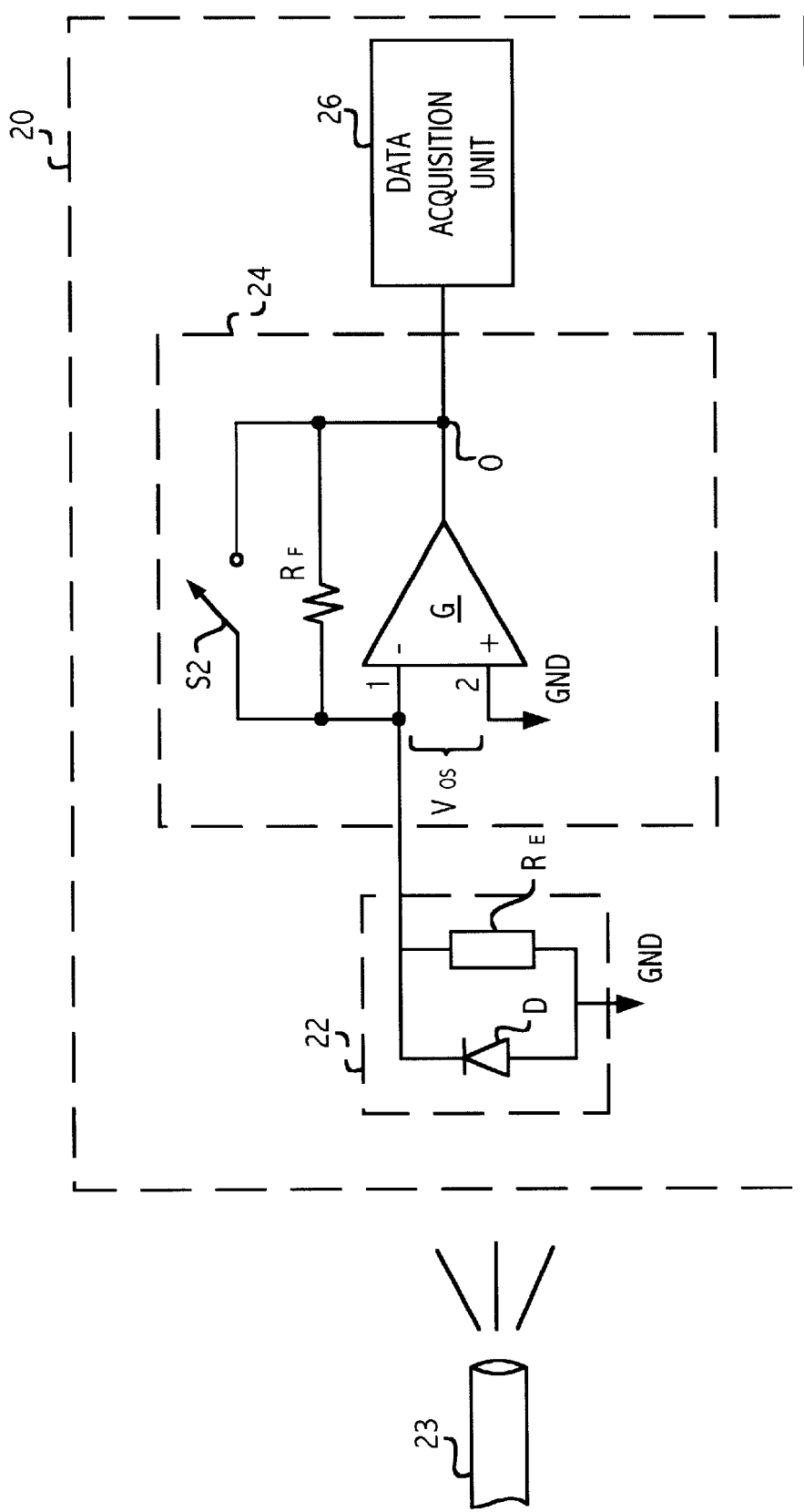

FIGS. 2A–2B show a zero calibration system 20, constructed according to an embodiment of the present invention, that does not rely on a dark signal measurement. The zero calibration system 20 is typically incorporated in an optical receiver (not shown) that performs photodetection, or conversion of applied optical signals into corresponding electrical signals. The zero calibration system 20 includes a photodetector 22 that is illuminated by an optical source 23. The photodetector 22 is switchably coupled to an amplifier 24 via a switch S1 as shown in FIG. 2A, or via switch S2 as shown in FIG. 2B. The optical source 23 is a semiconductor laser, cavity laser, light emitting diode, or other source suitable for illuminating the photodetector. Alternatively, the optical source 23 is a semiconductor laser, cavity laser, light emitting diode or other source coupled to an optical fiber (not shown) that is positioned to illuminate the photodetector 22. The photodetector 22 is shown as a photodiode D. However, other optical elements, sensors or subsystems that generate electrical signals in response to the illumination from the optical source 23 are alternatively used. The photodetector 22 has an associated equivalent resistance $R_E$ that is an internal resistance, equivalent series or shunt resistance, parasitic resistance, or combination of these resistances, depending on the type of photodetector 22 included in the optical receiver.

The amplifier 24 shown in FIGS. 2A–2B is in an inverting configuration and includes a differential gain block G having a feedback resistor $R_F$, coupled between an output O and the input I, that sets the gain of the amplifier 24. By making the feedback resistor $R_F$ within the amplifier 24 selectable, the gain of the amplifier 24 is also selectable. A single feedback resistor $R_F$ is shown as an example, however a network of selectable feedback resistors $R_F$ is readily incorporated in the amplifier 24. The input I of the amplifier 24 has an associated offset voltage $V_{OS}$. The input I of the amplifier 24 includes a non-inverting terminal 1 coupled to ground GND and an inverting terminal 2 coupled to the feedback resistor $R_F$ and the associated offset voltage $V_{OS}$ is an input offset voltage that occurs between the inverting terminal 1 and non-inverting terminal 2. As an alternative to the amplifier 24 in the inverting configuration as shown, the amplifier 24 is an amplifier in a non-inverting configuration, a precision instrumentation amplifier, or other type of amplifier suitable for amplifying and processing signals provided by the photodetector 22 in the zero calibration system 20.

A data acquisition unit 26 is coupled to the output O of the amplifier 24 and includes at least one analog-to-digital converter, voltmeter or other measurement unit, and a processor capable of manipulating acquired measurements. The data acquisition unit 26 measures an error signal at the output O of the amplifier 24, corresponding to the condition that the photodetector 22 is decoupled from the the amplifier 24 with illumination of the photodetector 22 being maintained. Under this condition the effect of the equivalent resistance $R_E$ is eliminated and the amplifier 24 behaves as a unity gain buffer and the measured error signal is the offset voltage $V_{OS}$ of the amplifier 24. In the example shown in FIG. 2A, the decoupling is achieved by configuring the switch S1 so that the connection between the photodetector 22 and the input of the amplifier 24 is opened. In the example shown in FIG. 2B, the decoupling is achieved by configuring the switch S2 so that the feedback resistor $R_F$ is short-circuited by the switch S2.

The data acquisition unit 26 also measures subsequent signals at the output O of the amplifier 24, corresponding to the condition that the photodetector 22 is coupled to the amplifier 24 and corrects these subsequently measured signals according to the measured error signal. A comparison of the relative values of the feedback resistor $R_F$ and the equivalent resistance $R_E$, conveniently performed by comparing the ratio of the feedback resistance $R_F$ and the equivalent resistance $R_E$ to a predetermined threshold, establishes how the data acquisition unit 26 corrects the subsequently measured signals at the output O of the amplifier 24 according to the measured error signal.

When the ratio of the feedback resistor $R_F$ to the equivalent resistance $R_E$ does not exceed the predetermined threshold, the data acquisition unit 26 corrects the subsequently measured signals at the output O of the amplifier 24 according to the measured error signal by offsetting the subsequently measured signals by the measured error signal. When the ratio of the feedback resistor $R_F$ to the equivalent resistance $R_E$ exceeds the predetermined threshold, the data acquisition unit 26 corrects the subsequently measured signals at the output O of the amplifier 24 according to the measured error signal by offsetting the subsequently measured signals by the measured error signal as modified by a correction factor. The correction factor is a multiplier equal to one plus the ratio of an feedback resistor $R_F$ to the equivalent resistance $R_E$. Alternatively, the correction factor is approximated as a multiplier equal to the ratio of the feedback resistor $R_F$ to the equivalent resistance $R_E$, for example when the ratio of the feedback resistor $R_F$ to the equivalent resistance $R_E$ is substantially greater than one.

With the photodetector coupled to the amplifier 24, the feedback resistor $R_F$ and the equivalent resistance $R_E$ of the photodetector 22 cause the subsequently measured signals at the output O of the amplifier 24 to include an error term that deviates from the measured error signal. This deviation between the error term and the measured error signal increases as the ratio of the feedback resistor $R_F$ to the equivalent resistance $R_E$ increases. As the deviation increases, the accuracy of the photodetection performed by the optical receiver correspondingly decreases. The threshold is determined according to a permissible inaccuracy in the photodetection, specified as a permissible offset in the photodetection attributable to the error term, or specified according to other suitable criteria. Typically, when the amplifier 24 is an amplifier in the non-inverting configuration, or when the amplifier 24 is a precision instrumentation amplifier, the deviation between the error term and the measured error signal is insignificant, and the data acquisition unit 26 corrects the subsequently measured signals at the output O of the amplifier 24 according to the measured error signal by offsetting the subsequently measured signals by the measured error signal.

Figure 3:
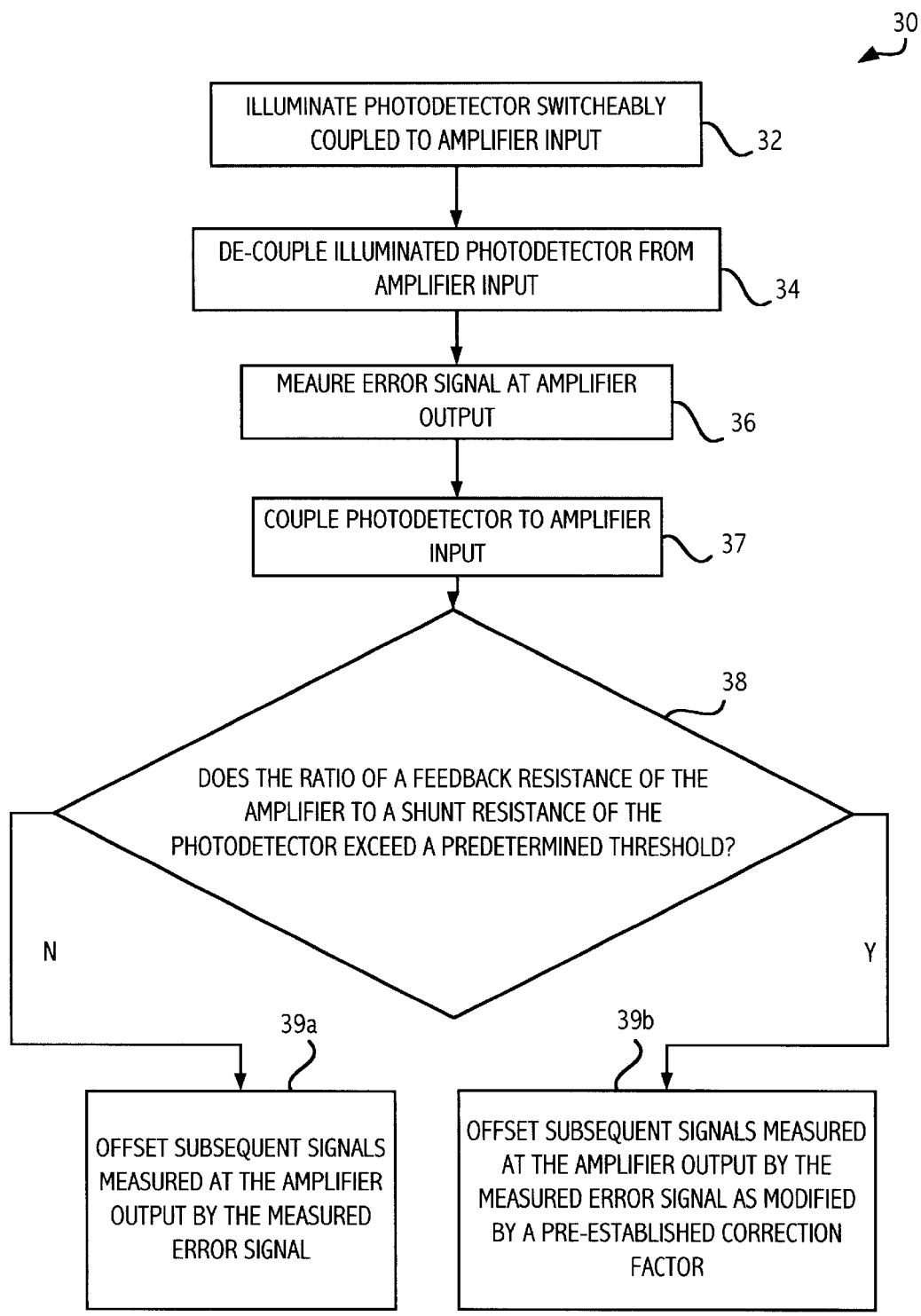
FIG. 3 shows a zero calibration method for an optical receiver constructed according to an alternative embodiment of the present invention

FIG. 3 shows the zero calibration method 30 for an optical receiver, constructed according to an alternative embodiment of the present invention. In step 32 of the method 30 a photodetector, included in the optical receiver and switchably coupled to an amplifier 24 included in the optical receiver, is illuminated. In step 34, the photodetector 22 is de-coupled from the amplifier 24 while maintaining illumination of the photodetector 22. The decoupling is achieved by opening a connection between the photodetector 22 and an input of the amplifier 24. Alternatively, the decoupling is achieved by short-circuiting a the feedback resistor $R_F$ coupled between the input of the amplifier 24, and an output O of the amplifier 24.

An error signal is measured at the output O of the amplifier 24 in step 36. The photodetector 22 is coupled to the amplifier 24 in step 37 and subsequent signals measured at the output O of the amplifier 24 are corrected according to the measured error signal in steps 39a and 39b, based on a comparison made in step 38 of the method 30. The comparison is based on the relative values of the feedback resistor $R_F$ and the equivalent resistance $R_E$, and is conveniently performed by comparing the ratio of the feedback resistance $R_F$ and the equivalent resistance $R_E$ to the predetermined threshold. The comparison establishes how the subsequently measured signals at the output O of the amplifier 24 are corrected according to the measured error signal. When the comparison made in step 38 indicates that the ratio of the feedback resistor $R_F$ to the equivalent resistance $R_E$ does not exceed the predetermined threshold, the subsequently measured signals at the output O of the amplifier 24 are corrected according to the measured error signal in step 39a by offsetting the subsequently measured signals by the measured error signal. When the comparison made in step 38 indicates that the ratio of the feedback resistor $R_F$ to the equivalent resistance $R_E$ exceeds the predetermined threshold, the subsequently measured signals at the output O of the amplifier 24 are corrected according to the measured error signal by offsetting the subsequently measured signals in step 39b by the measured error signal as modified by a correction factor. The correction factor is a multiplier equal to one plus the ratio of an feedback resistor $R_F$ to the equivalent resistance $R_E$, or the correction factor is approximated as a multiplier equal to the ratio of the feedback resistor $R_F$ to the equivalent resistance $R_E$, for example when the ratio of the feedback resistor $R_F$ to the equivalent resistance $R_E$ is substantially greater than one.

While the embodiments of the present invention have been illustrated in detail, it should be apparent that modifications and adaptations to these preferred embodiments may occur to one skilled in the art without departing from the scope of the present invention as set forth in the following claims.

What is claimed is:

1. A zero calibration system for an optical receiver, comprising:
   an illuminated photodetector;
   an amplifier switchably coupled to the photodetector; and
   a data acquisition unit coupled to an output of the amplifier, the data acquisition unit measuring an error signal at the output of the amplifier with the photodetector decoupled from the amplifier while maintaining illumination of the photodetector, measuring subsequent signals at the output of the amplifier with the photodetector coupled to the amplifier and correcting the subsequently measured signals at the output of the amplifier according to the measured error signal.

2. The zero calibration system of claim 1 wherein the photodetector is a photodiode having an equivalent resistance and the amplifier has a feedback resistor coupled between the output of the amplifier and an input of the amplifier.

3. The zero calibration system of claim 2 wherein correcting subsequent output signals measured at the output of the amplifier according to the error signal includes offsetting the subsequent signals measured at the output of the amplifier by the measured error signal when the ratio of the feedback resistor to the equivalent resistance does not exceed a predetermined threshold, and includes offsetting the subsequent signals measured at the output of the amplifier by the measured error signal as modified by a pre-established correction factor when the ratio of the feedback resistor to the equivalent resistance exceeds the predetermnined threshold.

4. The zero calibration system of claim 3 wherein the pre-established correction factor is a multiplier equal to one plus the ratio of an feedback resistor to the equivalent resistance.

5. The zero calibration system of claim 3 wherein the input of the amplifier includes a non-inverting terminal coupled to ground and an inverting terminal coupled to the feedback resistor.

6. The zero calibration system of claim 5 wherein the photodetector is decoupled from the amplifier while maintaining illumination of the photodetector by opening a connection between the photodetector and the input of the amplifier.

7. The zero calibration system of claim 5 wherein the photodetector is decoupled from the amplifier while maintaining illumination of the photodetector by short-circuiting the feedback resistor.

8. A zero calibration method for an optical receiver, comprising:

illuminating a photodetector included in the optical receiver, that is switchably coupled to an amplifier included in the optical receiver;

decoupling the photodetector from the amplifier while maintaining illumination of the photodetector;

measuring an error signal at an output of the amplifier;

coupling the photodetector to the amplifier; and correcting subsequent signals measured at the output of the amplifier according to the measured error signal.

9. The method of claim 8 wherein the photodetector is a photodiode having an equivalent resistance and the amplifier has a feedback resistor coupled between the output of the amplifier and an input of the amplifier.

10. The method of claim 9 wherein correcting subsequent signals measured at the output of the amplifier according to the measured error signal includes offsetting the subsequent signals measured at the output of the amplifier by the measured error signal when the ratio of the feedback resistor to the equivalent resistance does not exceed a predetermined threshold, and includes offsetting the subsequent signals measured at the output of the amplifier by the measured error signal as modified by a pre-established correction factor when the ratio of the feedback resistor to the equivalent resistance exceeds the predetermined threshold.

11. The method of claim 9 wherein decoupling the photodetector from the amplifier while maintaining illumination of the photodetector includes opening a connection between the photodetector and the input of the amplifier.

12. The method of claim 9 wherein decoupling the photodetector from the amplifier while maintaining illumination of the photodetector includes short-circuiting the feedback resistor.

13. The method of claim 10 wherein the pre-established correction factor is a multiplier equal to one plus the ratio of the feedback resistor to the equivalent resistance.

14. The method of claim 10 wherein measuring the error signal at the output of the amplifier and correcting subsequent signals measured at the output of the amplifier are performed by a data acquisition unit coupled to the output of the amplifier.

* * * * *